July 6, 1954 — J. B. PICARD — 2,682,892
PNEUMATICALLY ACTUATED FRICTION CATHEAD
Filed March 31, 1951 — 3 Sheets-Sheet 1

JOHN B. PICARD, INVENTOR.
BY Lyon & Lyon
ATTORNEYS

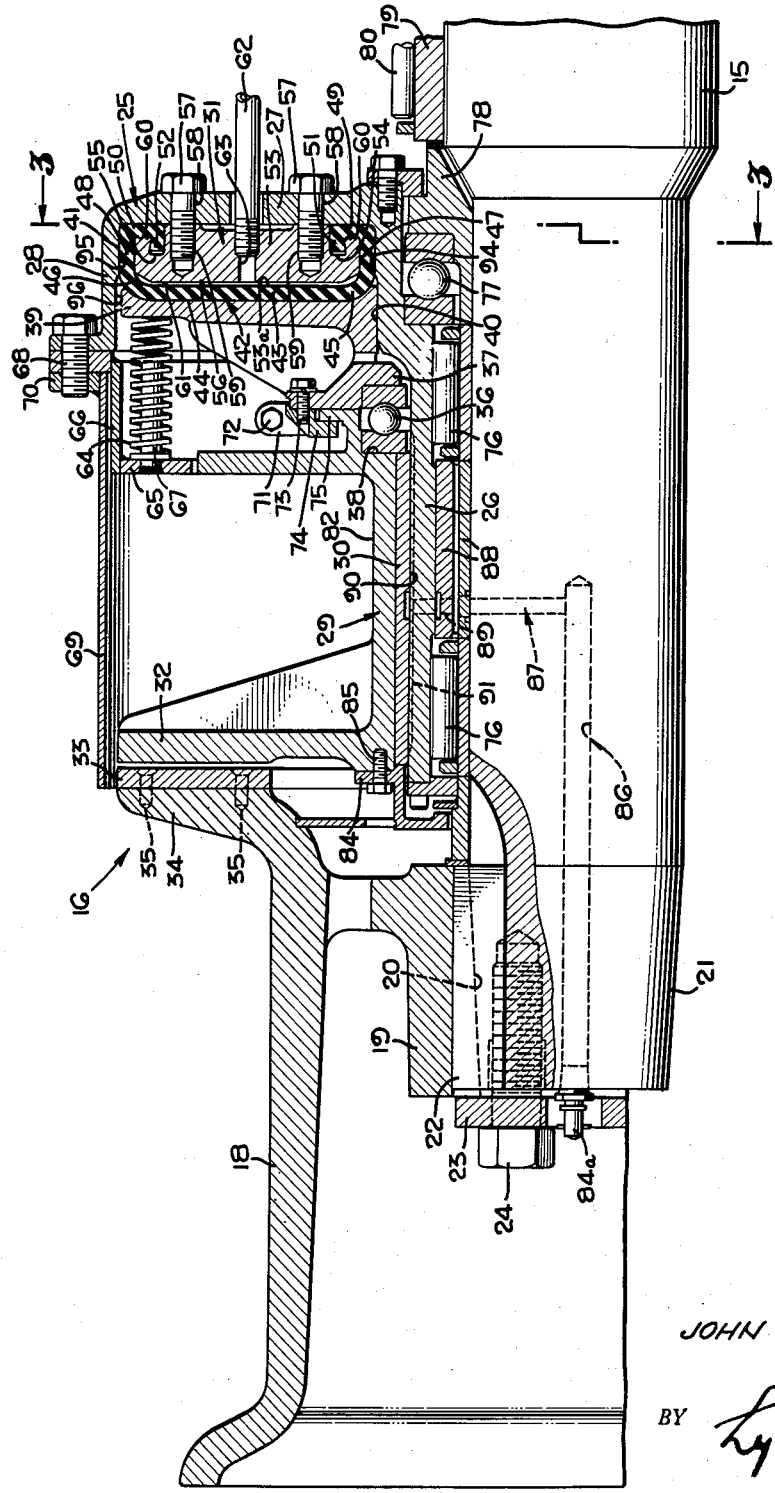

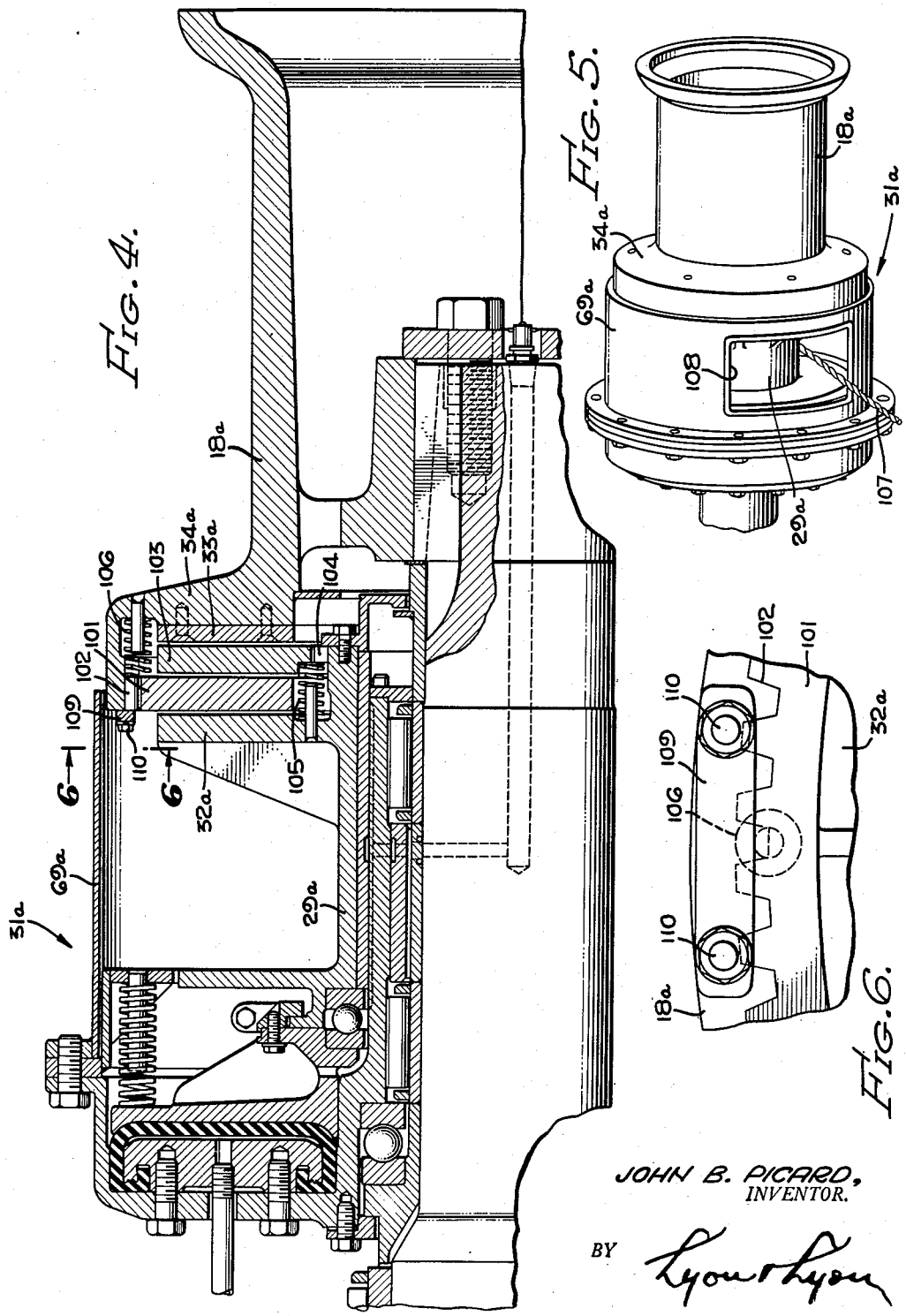

Patented July 6, 1954

2,682,892

UNITED STATES PATENT OFFICE 2,682,892

PNEUMATICALLY ACTUATED FRICTION CATHEAD

John B. Picard, Los Angeles, Calif., assignor to The National Supply Company, Pittsburgh, Pa., a corporation of Pennsylvania Application March 31, 1951, Serial No. 218,635

10 Claims. (Cl. 137—788)

This invention relates to pneumatic actuators and to friction catheads of the type shown in the copending applications of Spencer W. Long, Serial Nos. 669,518 and 46,789, filed May 14, 1946, and August 30, 1948, respectively, now Patent Nos. 2,640,683 and 2,640,684. Friction catheads of this general nature are employed in the coupling and uncoupling of threaded connections for drill pipe in the art of well drilling.

It is the principal object of this invention to provide an improved form of pneumatic actuator assembly.

Another object of this invention is to provide a friction cathead assembly having a novel form of pneumatic actuator.

Another object is to provide a friction cathead construction having a pneumatic actuator employing an annular diaphragm, the diaphragm operating on a maximum pressure area within a given size annular space.

Another object is to provide a pneumatic actuator having an annular diaphragm member provided with walls defining a central cavity, there being a nonresilient annular disk within the cavity for clamping certain of the walls against the wall of a housing for the diaphragm.

Other related and more detailed objects and advantages will appear from a consideration of the drawings and the following specification.

In the drawings:

Figure 2 is a sectional elevation showing a preferred embodiment of my invention as embodied in a spinning cathead having a single friction driving surface.

Figure 4 is a sectional view showing a modified form of my invention as applied to a break-out cathead employing multiple friction driving disks.

Figure 5 is a perspective view of the assembly shown in Figure 4.

Figure 6 is a fragmental detail taken substantially on the line 6—6 as shown in Figure 4.

Figure 1:
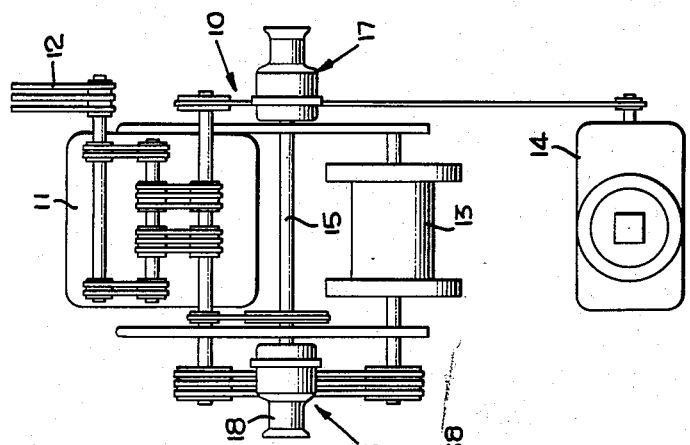
Figure 1 is a plan view in diagrammatic form showing a drawworks and rotary machine of the type employed in the drilling of wells, the drawworks being provided with friction catheads embodying my invention.
Figure 3:
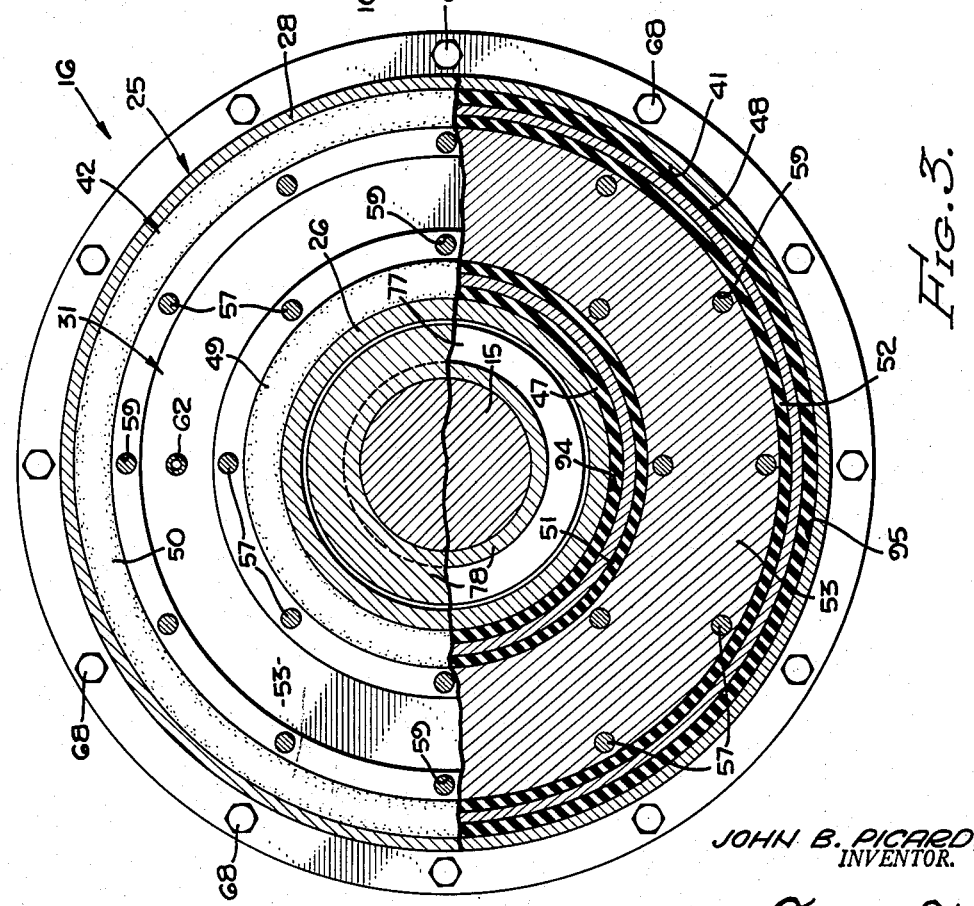
Figure 3 is a transverse sectional view taken substantially on the line 3—3 of Figure 2.

Referring to the drawings, the drawworks generally designated 10 includes the usual change-speed transmission portion 11 driven from any suitable source of power 12. The drawworks 10 includes a cable spooling drum 13 which is driven from the transmission 11. The rotary machine 14 may be driven from the drawworks 10 or from any other desirable source of power. The cat shaft 15 of the drawworks 10 carries a spinning cathead 16 on one end and a break-out cathead 17 on the other.

As shown in Figure 2, the spinning cathead 16 is mounted on an overhanging end of the cat shaft 15 and is provided with the usual spool 18. A hub 19 on the spool is provided with a taper bore 20 which receives the tapered end 21 of the shaft 15. A key 22 prevents relative rotation of the shaft and spool. The end plate 23 serves to prevent disassembly of the hub from the shaft, and this end plate is secured in place by means of a plurality of threaded elements 24 which are threaded into the end of the shaft.

A stationary member 25 includes an axially extending sleeve 26 which encircles a portion of the shaft 15, an end flange 27 and a cylindrical housing portion 28. This member 25 is held against rotation by means of a torque arm (not shown) which is connected to a stationary part of the drawworks 10. A spooling drum 29 is provided with a bearing sleeve 30 which serves to support the drum 29 on the stationary sleeve 26 and to permit it to rotate and to move axially with respect to the sleeve 26.

In accordance with my invention, pneumatically operated friction means are provided for driving the spooling drum 29 from the rotary spool 18. As shown in the drawings, this means includes an actuator assembly 31 which serves to move the drum 29 axially to bring the flange 32 of the spooling drum into frictional contact with the friction ring 33 on the rotary spool 18. The friction ring 33 may be attached to either the flange 32 or to the flange 34 of the spool 18. As shown in the drawings, threaded fastenings 35 connect the friction ring 33 to the flange 34. The actuator assembly includes an anti-friction thrust bearing 36 interposed between the thrust element 37 and the shoulder 38 on the spooling drum 29. The thrust element 37 includes an annular flange 39 formed integrally therewith and piloted on a cylindrical surface 40 provided on the stationary member 25.

The flange 39 and stationary member 25 cooperate to define an annular expansible chamber 41. An annular diaphragm member 42 is positioned in this chamber 41 and is generally C-shaped in cross-section. The central portion or web 43 of the diaphragm member 42 extends substantially radially and is in contact with the radial surface 44 on the flange 39. At its inner and outer boundaries the web 43 is curved as shown at 45 and 46 to join axially extending cylindrical rims 47 and 48. Radially extending flanges 49 and 50 on the diaphragm member 42 project from the cylindrical rims 47 and 48 respectively. Axially extending skirts 51 and 52 extend inwardly from the flanges 49 and 50. The diaphragm member 42 is formed of any suitable or desirable rubber-like material such as, for example, oil-resistant synthetic rubber. The web 43 constitutes the portion of the diaphragm member which moves in service. The other walls of the diaphragm member constitute clamping lips for anchoring the diaphragm member in place.

A nonresilient annular clamping disk 53 is positioned within the cavity 53a defined by the walls of the diaphragm member 42 for anchoring the diaphragm member 42 within the chamber 41. This disk 53 is provided with concentric annular grooves 54 and 55 which receive the axially extending skirts 51 and 52 respectively. The disk 53 is insertable into the cavity 53a through the annular entrance opening defined between the skirts 51 and 52 of the resilient diaphragm member 42. The forward face 56 of the disk 53 is shaped to conform to the shape of the diaphragm member 42. Threaded fastenings 57 extend through apertures 58 in the end flange 27 of the stationary member 25, and these fastenings are received in threaded bores 59 provided in the disk 53. The threaded fastenings are tightened to bring the disk 53 into metal-to-metal engagement with the flange 27 and thereby pinch the radially extending flange portions 49 and 50 of the diaphragm member between the metallic disk 53 and the end flange 27. The disk 53 may be provided with serrated or grooved surfaces 60 for the purpose of enhancing the pinching effect on the material of the diaphragm member 42. When the disk is clamped in place the thickness of the flanges 49 and 50 is reduced and the rubber-like material is displaced into the rims 47 and 48 and into the skirts 51 and 52. This action contributes to firmly anchoring the diaphragm member in place and for preventing leakage of pressure fluid.

From this description it will be understood that the radially inner and radially outer portions of the diaphragm member 42 are effectively anchored within the chamber 41.

A pneumatic fluid such as air under pressure is admitted into the annular space 61 between the diaphragm 42 and the surface 56 of the disk 53. This pneumatic fluid under pressure is admitted through inlet pipe 62 which is threaded into the disk 53 and which communicates with the space 61 by way of the port 63. The rims 47 and 48 are clamped between the disk 31 and the cylindrical surfaces 94 and 95 on the stationary member 25. The cylindrical surface 40 is slightly smaller in diameter than the cylindrical surface 94, and similarly, the cylindrical surface 96 is slightly larger in diameter than the cylindrical surface 95. Flexing action of the web 43 and particularly the curved ends 45 and 46 thereof occurs within the annular space between the surfaces 40 and 96, and consequently there is no binding or seizing of the flexing parts of the diaphragm member in use.

When pressure fluid is admitted into the annular space 61 the web portion 43 of the diaphragm member 42 moves to the left as viewed in Figure 2, thereby moving the flange 39 on the thrust element 37. Such movement of the flange 39 is resisted by means of coil springs 64 which are operatively positioned between the flange 39 and the rim 65 carried on the member 66. A stop pin 67 extends axially of each of the springs 64 to provide a guide therefor and also to limit over-travel of the flange 39 in an axial direction. The member 66 is fixed to the stationary member 25 by means of threaded elements 68. The elements 68 also serve to support the guard shell 69 by means of its end flange 70.

An axially split ring 71 held together by suitable fastenings 72 is secured to the thrust element 37 by means of threaded fastenings 73. A lip 74 on the split ring 71 overlies the radially extending rim 75 on the drum 29 so that the thrust element 37 may move the drum 29 to the right as viewed in Figure 2 under the action of the spring 64, when the fluid pressure is exhausted from the space 61.

Axially spaced radial bearings 76 are provided for supporting the stationary member 25 on the rotary shaft 15. A thrust bearing 77 is provided between the member 25 and the thrust collar 78. This thrust collar 78 abuts at its right-hand end against the inner race 79 of a shaft supporting bearing 80. The inner race 79 engages a shoulder (not shown) on the shaft to prevent axial sliding movement to the right.

A cable is spooled on the cylindrical surface 82 of the spooling drum 29 and extends out through a window (not shown) formed in the guard shell 69. The cable may be attached to a manila line for spinning threaded pipe connections together or may be attached to a tong for tightening the joint after the threads have been brought into initial engagement, as will readily be understood by those skilled in the art. When fluid pressure is admitted to the space 61 the diaphragm 42 is extended and it moves the flange 39 toward the left. This action causes the thrust bearing 36 to move the spooling drum 29 axially to bring the flange 32 into engagement with the friction ring 33. The rotation of the spool 18, therefore, turns the drum 29 in a direction to wind up the cable on the drum. The thrust of the flange 32 against the friction disk 33 and flange 34 is communicated to the shaft through the plate 23 and threaded fastenings 24. Likewise, the thrust against the disk 53 and end flange 27 of the stationary member 25 passes through the thrust bearing 77, thrust collar 78 and to the shaft by way of the inner race 79 and shoulder (not shown).

The bushing 30 may be fixed within the drum by means of a clamp ring 84 held in position by means of threaded fastenings 85. The bushing 30 is confined within the bore of the drum 29 and abuts one race of the bearing assembly 36 at one end and abuts the clamp ring 84 at the other end. A lubricant fitting 84a may be provided for injecting lubricant through the axial passage 86 and radial passage 87 for lubricating the bearings 36, 76 and 77. The spacers 88 and stationary sleeve 26 may be provided with axially aligned ports 89 through which lubricant may reach the inner surface 90 of the bushing 30. If desired, a shallow axial groove 91 may be provided in the sleeve 26 for distributing lubricant along the length of the bushing 30 and for leading it to the bearing 36.

The modified form of my invention shown in Figures 4-6 is substantially the same as that previously described with the exception that a plurality of friction disks are provided to increase the maximum torque which may be applied to rotate the drum 29a. The end flange 32a of the drum bears against a friction disk 101 which is connected to the rotary spool 18a by means of splines 102. A second friction disk 33a is fixed to the flange 34a of the spool 18a. Interposed between the disks 33a and 101 is a disk 103 which is connected to the drum 29a my means of splines 104. Coil springs 105 act to spread the flange 32a and disk 103, while coil springs 106 act to spread the disks 33a and 101. When the pneumatic actuator assembly 31a is energized, the drum 29a is shifted to the right as viewed in Fig. 4, compressing the springs 105 and 106 and bringing the disks 32a, 101, 103 and 33a into friction driving relationship. Torque is then transmitted from the rotary spool 18a through the friction surfaces to cause the drum 29a to wind up a cable 107 spooled thereon. The cable extends out through a window 108 formed in the guard shell 69a. This cable may be attached to a tong used for breaking the threaded connection between adjacent sections of drill pipe. A plurality of retaining elements 109 may be mounted on the rotary spool 18a for limiting the movement of the disk 101 under the action of the coil springs 106. These retainer elements may be held in place by threaded fastenings 110.

Having fully described my invention, it is to be understood that I do not wish to be limited to the details herein set forth, but my invention is of the full scope of the appended claims.

I claim:

1. In a pneumatic actuator, the combination of: a housing member having walls defining an annular chamber, an annular resilient diaphram member received in said chamber, said diaphragm member having parts defining an annular cavity therein, the said parts including a radially extending axially movable web, an annular nonresilient disk within said cavity, clamp elements connecting the disk and said housing member acting to clamp parts of the diaphragm member therebetween to anchor the diaphragm member with respect to the housing member, and means extending through the disk for admitting a fluid under pressure between the disk and the web.

2. In a pneumatic actuator, the combination of: a housing member having walls defining an annular chamber, an annular resilient diaphragm member received in said chamber, said diaphragm member having parts defining an annular cavity therein, there being an annular entrance opening into said cavity on one side of the diaphragm member, the other side of the diaphragm member comprising a radially extending axially movable web, an annular nonresilient disk insertable into said cavity through said entrance opening, axially extending clamp elements extending through said opening and connecting the disk and said housing member, said clamp elements acting to clamp parts of the diaphragm member against the housing member to anchor the diaphragm member with respect to the housing member, and means extending through the said opening and through the disk for admitting a fluid under pressure between the disk and the web.

3. In a pneumatic actuator, the combination of: a housing member having walls defining an annular chamber, an annular resilient diaphragm member received in said chamber, said diaphragm member having a radially extending axially movable web and having axially extending rims at the inner and outer boundaries of the web, each of the rims having a radially extending flange connected thereto, the web, rims and flanges cooperating to define a cavity, an annular nonresilient disk within said cavity, clamp means connecting the disk and said housing member acting to clamp the flanges therebetween, and means for admitting a fluid under pressure between the disk and the web.

4. In a pneumatic actuator, the combination of: a housing member having walls defining an annular chamber, an annular resilient diaphragm member received in said chamber, said diaphragm member having a radially extending axially movable web and having axially extending rims at the inner and outer boundaries of the web, each of the rims having a radially extending flange connected thereto, the web, rims and flanges cooperating to define a cavity, an annular nonresilient disk within said cavity, axially extending clamp means positioned between the said flanges of the diaphragm member and connecting the disk and said housing member, said clamp means acting to clamp the flanges against one wall of the annular chamber, and means for admitting a fluid under pressure between the disk and the web.

5. In a pneumatic actuator, the combination of a housing member having concentric cylindrical walls and a radial wall cooperating to define an annular chamber, an annular resilient diaphragm member received in said chamber, said diaphragm member having a radially extending axially movable web and having axially extending rims at the inner and outer boundaries of the web engaging said cylindrical walls, each of the rims having a radially extending flange connected thereto engaging the radial wall, the web, rims and flanges cooperating to define a cavity, an annular nonresilient disk within said cavity, axially extending clamp means positioned between the said flanges of the diaphragm member and connecting the disk and said housing member, said clamp means acting to clamp the flanges against said radial wall of the annular chamber and to distort the rims into engagement with the concentric walls of the chamber to anchor the diaphragm member with respect to the housing member, and means extending between the flanges and through the disk for admitting a fluid under pressure between the disk and the web.

6. In a pneumatic actuator, the combination of: a housing member having concentric cylindrical walls and a radial wall cooperating to define an annular chamber, an annular resilient diaphragm member received in said chamber, said diaphragm member having a radially extending axially movable web and having axially extending rims at the inner and outer boundaries of the web engaging said cylindrical walls, each of the rims having a radially extending flange connected thereto engaging the radial wall, the web, rims and flanges cooperating to define a cavity, an annular nonresilient disk within said cavity and provided with inner and outer radially spaced grooves, a skirt on each of said flanges concentric with the rims and each extending axially into one of said grooves, clamp means connecting the disk and said housing member acting to clamp the flanges therebetween, and means extending between the flanges and through the disk for admitting a fluid under pressure between the disk and the web.

7. In a pneumatic actuator, the combination of: a housing member having walls defining an annular chamber, an annular expansible diaphragm member received in said chamber, the diaphragm member having a radially extending axially movable portion joined to clamping lips at its radially inner and outer boundaries, an annular disk in said chamber, clamp means connecting the disk and said housing member for clamping the diaphragm lips axially therebetween, means for admitting fluid under pressure between the disk and the axially movable portion of the diaphragm member, and a thrust element mounted for axial movement on said housing member having a surface engaged by the axially movable portion of the diaphragm member.

8. In a pneumatic actuator, the combination of: a housing member having walls defining an annular chamber, an annular expansible diaphragm member within the chamber having a radially extending axially movable web joined to clamping lips at its radially inner and outer boundaries, each of the clamping lips having an axially extending rim and a radially extending flange connected thereto, the web, rims and flanges cooperating to define an annular cavity within the diaphragm member, a nonresilient annular disk in said diaphragm cavity, clamp means connecting the disk and said housing member for clamping the diaphragm flanges axially therebetween, means for admitting fluid under pressure between the disk and the web portion of the diaphragm member, and a thrust element mounted for axial movement on said housing member having a surface engaged by the web of the diaphragm member.

9. For use in a pneumatic actuator having a housing and an annular clamping disk, the improvement comprising: an annular resilient diaphragm member adapted to be received in said housing, said member being C-shaped in cross-section and comprising a radially extending axially movable web joined to clamping lips at its radially inner and outer boundaries, each of the clamping lips comprising an axially extending rim and a radially extending flange connected thereto, the web, rims and flanges cooperating to define a cavity to receive the annular clamping disk.

10. For use in a pneumatic actuator having a housing member provided with an annular chamber, the combination of: an annular resilient diaphragm member for reception in said chamber, said diaphragm member having a radially extending axially movable web and having axially extending rims at the inner and outer boundaries of the web, each of the rims having a radially extending flange connected thereto, the web, rims and flanges cooperating to define a cavity, an annular nonresilient disk within said cavity and provided with inner and outer radially spaced grooves, a skirt on each of said flanges concentric with the rims and each extending axially into one of said grooves, means on the disk between said flanges whereby it may be moved toward the housing member to clamp the flanges between the disk and housing member, and means extending between the flanges and through the disk for admitting a fluid under pressure between the disk and the web.

References Cited in the file of this patent

UNITED STATES PATENTS

| Number | Name | Date |
| --- | --- | --- |
| 1,924,888 | Tatter | Aug. 29, 1933 |
| 2,135,617 | Geyer | Nov. 8, 1938 |
| 2,193,481 | Fawick | Mar. 12, 1940 |
| 2,242,367 | Naab | May 20, 1941 |
| 2,328,133 | Foster | Aug. 31, 1943 |
| 2,446,694 | Dickson | Aug. 10, 1948 |
| 2,550,672 | Chyba | May 1, 1951 |
| 2,551,489 | Eichmann | May 1, 1951 |
| 2,626,020 | Keller | Jan. 20, 1953 |